United States Patent [19]

Zamitter

[11] Patent Number: 4,763,885
[45] Date of Patent: Aug. 16, 1988

[54] PLANAR SPRING

[75] Inventor: Mikhail Zamitter, Kiev, U.S.S.R.

[73] Assignee: Kievsky Inzhenerno-Stroitelny Institut, Kiev, U.S.S.R.

[21] Appl. No.: 306,614

[22] PCT Filed: Sep. 1, 1980

[86] PCT No.: PCT/SU80/00155

§ 371 Date: Sep. 24, 1981

§ 102(e) Date: Sep. 24, 1981

[87] PCT Pub. No.: WO81/02141

PCT Pub. Date: Aug. 6, 1981

[30] Foreign Application Priority Data

Jan. 25, 1980 [SU] U.S.S.R. .............................. 2873951

[51] Int. Cl.[4] .............................................. B60B 11/00
[52] U.S. Cl. .................................... 267/227; 267/229; 267/36.1; 267/158; 267/160; 267/182; 267/47; 280/668
[58] Field of Search ...................... 267/15 R, 36 A, 71, 267/74, 158, 160, 164, 182, 40, 41, 44, 47, 49, 69, 8 R, 8 B, 228–230, 227, 36.1; 280/688, 668

[56] References Cited

U.S. PATENT DOCUMENTS

| | | | |
|---|---|---|---|
| 100,626 | 3/1870 | Henry | 267/47 |
| 1,096,570 | 5/1914 | Skulstad | 267/44 |
| 1,564,299 | 12/1925 | Welsh | 267/41 |
| 1,643,050 | 9/1927 | Blackmore | 267/160 |
| 1,958,188 | 5/1934 | Drews | 267/158 |
| 2,748,370 | 5/1956 | Baltosser | 267/160 |
| 3,177,963 | 4/1965 | Mitchell | 267/47 |
| 3,192,551 | 7/1965 | Appel | 267/158 |

FOREIGN PATENT DOCUMENTS

| | | | |
|---|---|---|---|
| 543638 | 1/1931 | Fed. Rep. of Germany. | |
| 614660 | 6/1935 | Fed. Rep. of Germany | 267/158 |
| 147158 | 12/1978 | Japan | 267/158 |
| 167938 | 12/1981 | Japan | 267/158 |
| 2091379 | 7/1982 | United Kingdom | 267/158 |
| 68006 | 3/1947 | U.S.S.R. . | |
| 87580 | 12/1949 | U.S.S.R. . | |
| 409287 | 12/1949 | U.S.S.R. . | |
| 198935 | 9/1969 | U.S.S.R. . | |
| 81/02141 | 8/1981 | U.S.S.R. | 267/158 |
| 1004685 | 3/1983 | U.S.S.R. . | |

OTHER PUBLICATIONS

Article Detali i uzly priborov, Moscow, "Mashinostroenie", 1965, p. 368, FIG. 24 3a, D. D. Churabo.
Article "Elements and Units of Instruments—Design and Calculations" by D. D. Churabo, *Mashinostroenie*, Publishing House Moscow 1965, pp. 371 and 372.

*Primary Examiner*—Douglas C. Butler
*Attorney, Agent, or Firm*—Fleit, Jacobson, Cohn & Price

[57] ABSTRACT

A spring is constructed as a resilient U-shaped piece comprising a middle portion and leg portions disposed in the same plane, the leg portions including a bearing for taking an external load. The bearings are disposed on the leg portions in such a manner that a line passing through the centers of the bearings is parallel to the middle portion.

17 Claims, 5 Drawing Sheets

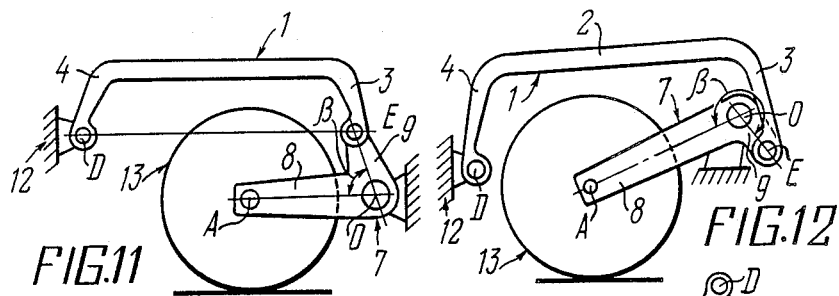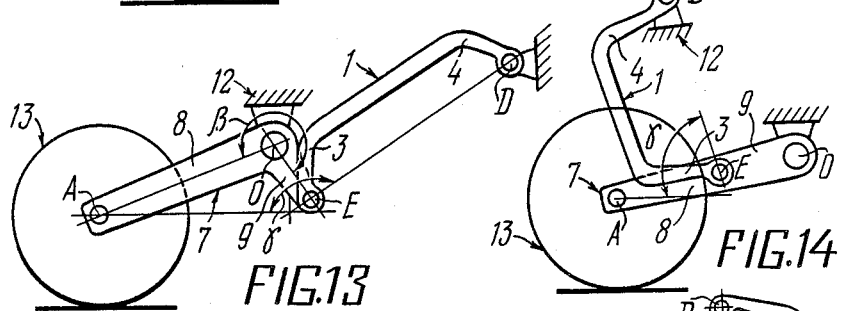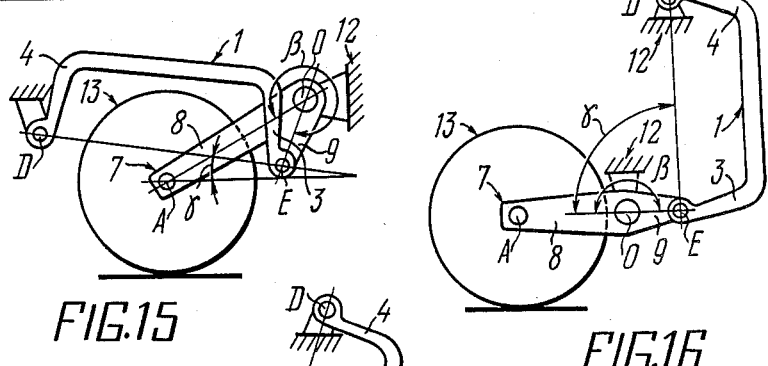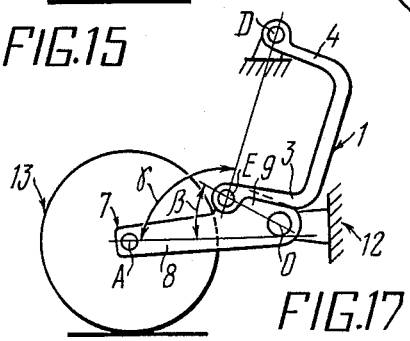

PLANAR SPRING

TECHNICAL FIELD

The invention relates to means for damping dynamic loads in supporting structures, and more particularly, it concerns a spring and a vehicle suspension including such springs.

BACKGROUND ART

Springs and spring suspensions are widely known. In automotive vehicles, leaf springs comprising, as a rule, a plurality of resilient metal strips have gained the widest application. The main disadvantage of the leaf springs is that they constitute from 8 to 10% of the total mass of motor vehicles. Moreover, in order to absorb shocks caused by heavy loads, the number of strips in the spring must be increased, thereby affecting the damping capacity of the spring.

The progressive-rate springs possess the best damping capacity. For example, known in the art is a spring comprising a resilient strip provided with bent ends pivotally connected with a supporting structure (see German Pat. No. 543,638 published 8 Feb. 1932). However, to permit damping of large dynamic loads by means of such a spring, it is necessary to use a plurality of resilient strips in contact therebetween, each of which (similar to other prior art leaf springs) is capable of bending in the plane of its lowest rigidity, a plane which coincides with the plane of action of an external load. This spring is also characterized by a complex design, which is due to the necessity of using mounting members to ensure load induced contact between flat and bent strips. To gain load induced interaction between the above-described spring and the vehicle components joined therewith it is necessary to provide at least three devices, namely two supporting assemblies disposed at the spring ends and one assembly disposed at the middle portion to take up external loads.

Also known in the art is a flat U-shaped spring operating as a girder freely lying on two supports (see D. D. Churabo, Detali i uzly priborov, Moscow, "Mashinostroenie", 1965, p. 368, FIG. 24, 3a). This spring is also capable of bending under the action of external forces in the plane of its lowest rigidity, i.e. it can not withstand considerable loads (in the order of hundreds of kilograms forces) until an adequate increase in the thickness thereof, such an increase nevertheless leads to a decrease in the damping capacity and to an increase in the spring mass. To render such a spring operative at least three devices for load induced interaction with the vehicle components are to be provided, namely two supporting means at the leg portions, and one means disposed in the middle portion to take up external loads. Such springs have not found wide application in vehicle suspensions.

A spring is generally used as a resilient means of vehicle suspensions. A spring suspension may comprise a guiding means, and a damping means (damper).

Suspensions provided with leaf springs are bulky while those provided with coil springs are complicated. For example, the suspension disclosed in USSR Inventor's Certificate No. 87580, comprises road coil springs disposed within a housing which is fixed to the sprung portion of a vehicle, and guiding double-arm levers (two levers per wheel). Long arms of the levers are pivotally joined with a wheel axle of the vehicle. The fulcrum of each lever is also pivotally connected to the sprung portion of the vehicle while the short arm interacts with the above-mentioned springs.

The above-described suspension provides for a substantially rectilinear up and down movement of the wheels when crossing an obstacle, though it is also characterized by a complex design and significant mass. The complexity of such a suspension is due to the fact that resilient and guiding devices of each wheel are disposed within a separate housing mounted outside the frame of the vehicle and fixed to the frame either by means of a special girder structure (for front wheels), or by broad flanges (for rear wheels). Each of the housings contains two double-arm levers and three springs, two of which operate during the working stroke (when the wheel rises) and one spring provides a rebound effect (when the wheel goes down). Each of the springs is subjected only to compression. The heavy mass of the above-described suspension is due to the fact that parts utilized therein are subjected to considerable forces, concentrated forces among them. The parts must therefore be of large dimensions and heavy mass in order that the stresses arising therein lie within the safe limits. Thus, the short arm of the lever for the front wheels is subjected to a concentrated load which exceeds a force exerted on the long arm connected to the wheel axle by the ratio between the lengths of the short and the long arms, the ratio being 2.5 to 3.5. The above ratio cannot be decreased because the deflection of the road coil spring, determined by the required rigidity and dimensional limits thereof, is relatively low. The contact stresses arising in the elements of the higher kinematic and geometrically open pair between the short arm of the guiding lever, the spring plate being in contact over a rather small surface area, appear to be rather high, and in order to maintain the above stresses within allowable limits, it is necessary to increase the dimensions of the contacting elements thus resulting in a respective increase in the mass of the parts.

A more reliable articulation joint in this kinematic pair is impossible without further complicating the design.

Bearings of the double-arm guiding lever are loaded by the forces whose geometric sum affects the arms thereof. A substantial increase in the dimensions of the arms is required in view of the above ratio between their lengths, and which, in turn, results in an increase in the mass of the housing containing the suspension.

DISCLOSURE OF INVENTION

The invention is directed to the provision of a planar spring of a lower mass compared with the prior art springs, more durable and capable of carrying heavier loads than heretofore known.

The problem is solved by a spring constructed as a resilient U-shaped piece having a middle portion and leg portions disposed in the same plane, and a bearing means disposed on one of the leg portions and a means for taking an external load, said means for taking an external load being disposed on the other leg portion in such a manner that the line passing through the centers of the bearing means and of the means for taking an external load is parallel to the middle portion.

The above-described spring design makes it possible to obtain such a situation when the middle portion thereof deflects in the plane of its maximum rigidity under the action of an external load and of the reaction balancing this load. As a result, the mass of such a spring can be significantly smaller as against the mass of the prior art leaf springs and the above-mentioned U-shaped spring without any decrease in strength as against the latter. The required compliance (springiness) of the spring is ensured both by the deflection of the middle portion thereof and by relative displacement of the leg portions under the action of an external load. Damping capacity of the spring is also ensured by the fact that the highest stresses over all the cross-sections may reach the maximum allowable value for the given spring material. Thus, in the inventive spring each unit of the mass thereof can absorb, without being damaged, the maximum potential energy of elastic strain permissible for the given material.

A decrease in the spring mass is also possible due to the fact that for operation thereof it is sufficient to provide two means for load induced interaction with vehicle components, i.e., one bearing means and one means for taking an external load which means are preferably disposed at the ends of the leg portions. Elements of cylindrical or ball joints can be utilized in the design of the above assemblies.

To achieve more efficient distribution of the potential strain energy along the length of the spring, the middle portion and the leg portions of the spring are to be of variable cross-section. If the spring is to be subjected mainly to compression and is of a rectangular cross-section, the middle portion of a uniform thickness must be made tapering on one or both narrow sides toward and relative its ends, and if the spring is to be subjected mainly to tension, the middle portion thereof must be of a constant height and have a taper on one or both wide sides towards its central section. In both cases, the leg portions have cross-sections that are uniform in thickness, and variable in height.

To decrease the spring mass, it is to be constructed in such a manner that in each of the cross-sections of the middle portion thereof, the ratio between the maximum moment of inertia relative the main central axis and the bending moment be kept constant, and the cross-sections are orientated relative the plane of the spring deflection in such a manner that the axis of each cross-section relative which the moment of inertia of the cross-section is a maximum is normal to the plane of the spring deflection.

It is to be understood that leg portions with a rectilinear neutral axis may have the lowest possible mass. Therefore, rectilinear leg portions extending at an angle of 90° to 110° to the middle portion are desirable in the novel planar spring. When the angle is greater than 110°, the strength of the spring will be increased, but the dimensions and the total mass thereof will be increased as well due to the fact that in order to maintain the compliance of the spring the lengths of the leg portions are to be extended. When the angle is smaller than 90°, the strains within the junction area between the leg portions and the middle portion of the spring increase considerably, i.e., the strength of the spring decreases.

An increase in compliance and a decrease in stress concentration can be achieved in the novel planar spring provided with leg portions each having a curvilinear neutral axis. In this case, the calculation of strength of such leg portions is fairly simple when each leg portion has the neutral axis of a constant radius of curvature radius of the neutral line.

The object set forth is also attained in the vehicle suspension comprising a spring and a guiding double-arm lever whose short arm is operatively connected with said spring while the long arm has elements for pivotal connection with a vehicle axle and with its sprung portion respectively. The spring is constructed as above described, one of its leg portions is pivotally connected with the short arm of the guiding lever while the other is, also pivotally, connected with the sprung-portion of the vehicle, the arms of the guiding lever being in the same plane.

Utilization of the inventive spring in a vehicle suspension as a flexible means results in a significant decrease in the mass thereof as against any of the prior art suspensions, the absorbing capacity and the operating reliability being the same. Moreover, such a suspension is characterized by a simple design and is easy to manufacture.

If required, a damper may be also included in the inventive suspension.

The shape of the guiding double-arm lever and the method of installation of the spring within the inventive suspension are determined by operating conditions and by the design of the vehicle for which the suspension is designed.

When the distance from a wheel axle to the lower surface of the sprung portion of a vehicle within the area of spring location is limited, it is possible to use a guiding lever in which the angle between the geometric axes of the long and the short arms counted clockwise (hereinafter the angles are counted only clockwise) lies within 0° and 180°. The spring must be installed in such a manner that the line connecting the centers of the spring elements for pivotal connection be parallel to the line connecting the axles of the vehicle wheels. Under such conditions the ends of the leg portions of the spring are to be orientated in the direction of the sprung portion of the vehicle. When there are no strict limitations as to the distance between the wheel axle and the lower surface of the sprung portion of the vehicle within the area of spring location, and as to the distance between the wheel axle and the upper surface of the middle portion of the spring, the ends of the leg portions of the spring can be orientated in the opposite direction (to the road bed).

In the case when substantial changes in the distance between the wheel axle of the vehicle and the middle portion of the spring are undesirable, an external load can be damped mainly by way of elastic strains (displacements) of the spring leg portions, which are to be of a greater length than in the above-described embodiments of the suspension. In doing so, the guiding lever is to be constructed in such a manner that the angle between the geometric axes of the long and the short arms be greater than 180°. The spring is to be mounted as above described, i.e., in such a manner that the angle between the line connecting the wheel axles of the vehicle and the line connecting the centers of the spring elements for pivotal connection be equal to 0°.

When the distances between the wheel axle of the vehicle and the sprung portion thereof are limited, the spring of the suspension is preferably removed from the zone of the wheel location and disposed in some other place, e.g., in the region of the luggage compartment of a motor car. In doing so, it is necessary to employ a lever wherein the angle between geometric axes of the long and the short arms is greater than 240°, and the spring must be installed in such a manner that the angle between the line connecting the wheel axles and the line connecting the centers of the spring elements for pivotal connection is greater than 90°.

With limitations for the minimum value of the clearance, the suspension spring is preferably installed in such a manner that it be subjected mainly to compression.

When the suspension spring is installed in the region of the wheel of the vehicle and there are no limitations for the distance from its upper hinge to the wheel axle, a guiding lever can be used wherein the angle between the geometric axes of the long and the short arms is 0° (i.e., such a lever wherein a portion of the long arm serves as the short arm). In doing so, the spring is to be installed in such a manner that the angle between the line connecting the wheel axles of the vehicle and the line connecting the centers of the spring elements for pivotal connection is not greater than 90°.

When the spacing above the axle is limited, the spring is to be installed in such a manner that the angle between the line connecting the wheel axles of the vehicle and the line connecting the centres of the spring elements for pivotal connection be greater than 0°. In this case the guiding lever must be so constructed that the angle between the geometric axes of its long and short arms is greater than 270°.

When removing the spring beyond the region of the wheel of the vehicle, a guiding lever can be used wherein the angle between the geometric axes of its long and short arms is equal to 180°. In doing so, the spring is to be installed in such a manner that the angle between the line connecting the wheel axles of the vehicle and the line connecting the centers of the spring elements for pivotal connection is equal to 90°.

A suspension being similar to the above described though more compact, may be obtained by using a guiding lever wherein the angle between the geometric axes of its long and short arms is smaller than 90°, and by installing the spring in such a manner that the angle between the line connecting the wheel axles of the vehicle and the line connecting the centers of the spring elements for pivotal connection is more than 90°.

If required, a damper and reactive rods to take side forces and reactive and brake moments can be included in the inventive suspension. The shape of the inventive suspension makes it possible in some cases, e.g., in the suspension of a truck cabin, to manage without a guiding lever, and to install a damper between the leg portions of the spring. Such a design is characterized by compactness.

BRIEF DESCRIPTION OF DRAWINGS

The invention will be further described in more detail with reference to the accompanying drawings showing illustrative examples of embodiments thereof, and in which:

FIGS. 11, 12, 13, 14, 15, 16 and 17 are the embodiments of the vehicle suspension including the spring of the invention;

BEST MODE FOR CARRYING OUT THE INVENTION

Figure 1:
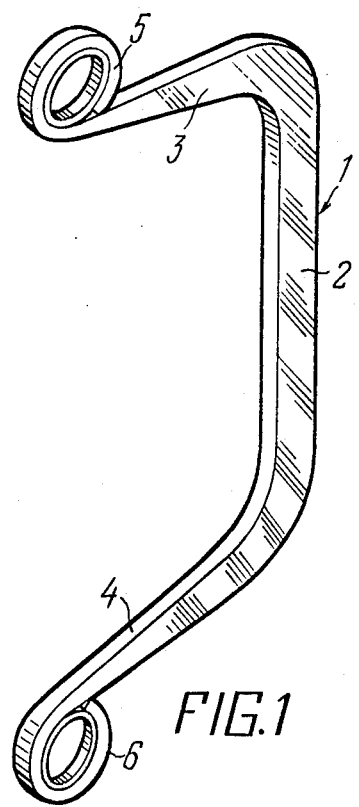
FIG. 1 is a general view of the spring of the invention.

An inventive spring 1 is constructed as a resilient U-shaped piece (see FIG. 1) comprising a middle portion 2 and leg portions 3,4 disposed in the same plane. On the ends of the leg portions 3,4 there are disposed a means for taking an external load, and a bearing means which are constructed as eyes 5,6 whose inner surfaces are elements for pivotal connection.

Figures 2, 3:
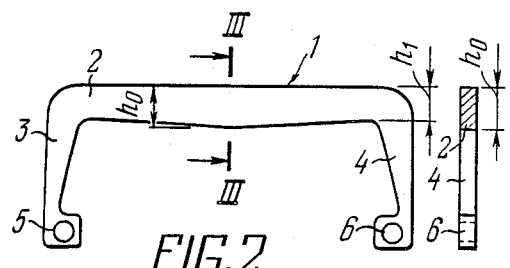
FIG. 2 is a front projection of a spring subjected mainly to compression.
FIG. 3 is a cross-sectional view of the spring shown in FIG. 2.

FIG. 2 shows the spring 1 having a rectilinear cross-section and designed to be subjected mainly to compression. The middle portion 2 of this spring 1 decreases in height in the direction of its ends in such a manner that $h < h_o$. FIG. 3 shows a cross-section of this spring.

Figures 4, 5:
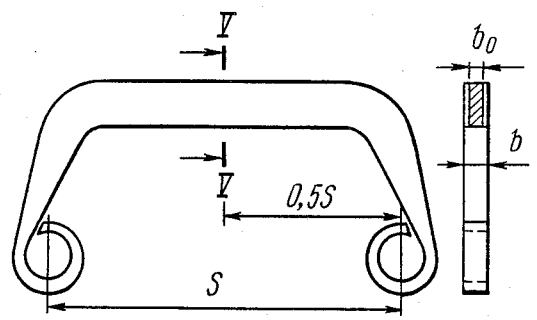
FIG. 4 is a front projection of a spring subjected mainly to tension.
FIG. 5 is a cross-sectional view of the spring shown in FIG. 4.

The spring of a rectilinear cross-section designed to be subjected mainly to tension, comprises a middle portion 2 decreasing in thickness in the direction of its middle portion in such a manner that $b_o < b$ (FIGS. 4,5).

The springs shown in FIGS. 2 through 5 have rectilinear leg portions.

Figures 6, 7:
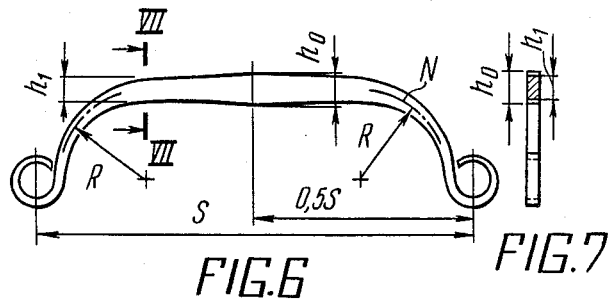
FIG. 6 is a spring provided with curvilinear leg portions.
FIG. 7 is a cross-sectional view of the spring shown in FIG. 6.

FIG. 6 shows the spring 1 whose leg portions 3,4 are constructed curvilinear, the radius of curvature R along the neutral line N of the leg portions 3,4 being constant. This spring is characterized by high compliance with decreased stress concentration as against the rectilinear leg portions. FIG. 7 shows a cross-sectional view of this spring.

Figure 8:
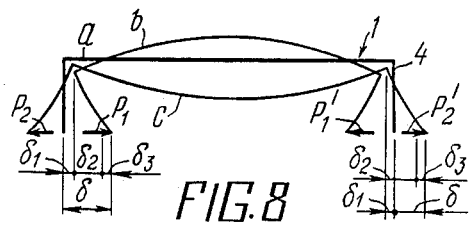
FIG. 8 is a diagram of spring operation.

The operating diagram of the inventive spring is shown in FIG. 8. This diagram shows three positions of the spring: a—a non-loaded spring (thick line), b—a compressed spring, and c—expanded spring (thin lines). Vectors $P_1$, $P_1'$ and $P_2$, $P_2'$ show the forces compressing and expanding the spring.

As it can be seen in FIG. 8, the total strain $2\delta$ of the spring 1 is equal to the doubled algebraic sum of displacements $\delta_1$, $\delta_2$, $\delta_3$. For the spring subjected to compression, $2\delta = 2(\delta_1 + \delta_2 + \delta_3)$. For the spring subjected to tension, $2\delta = 2(\delta_2 + \delta_3 - \delta_1)$.

The displacement $\delta_2$ is the most significant constituent of the total strain 2.

Figure 9:
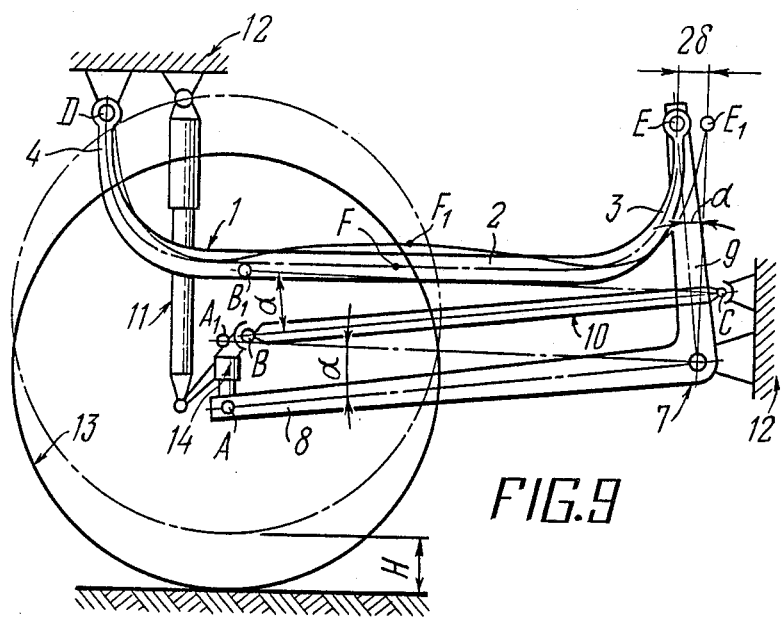
FIG. 9 is a vehicle suspension including the spring of the invention.

FIG. 9 shows a modification of the vehicle suspension including the spring of the invention. For each of the wheels the suspension comprises a spring 1, a guiding lever 7 having a long arm 8 and a short arm 9, a leg portion 3 of the spring 1 being pivotally connected to the short arm 9, a reactive rod 10, and a damper 11. FIG. 9 shows a frame 12 of a vehicle, a wheel 13, and an axle 14 of the wheel 13. As it can be seen in FIG. 9, a leg portion 4 of the spring 1, one end of the damper 11, one end of the reactive rod 10, and the guiding lever 7 are pivotally connected, in the suspension of each wheel 13, to the frame 12 of the vehicle. The long arm 8 of the guiding lever 7 and the other ends of the damper 11 and of the reactive rod 10 are, also pivotally, connected to the axle 14 of the wheel 13.

The letter A in FIG. 9 designates the center of the assembly for fastening the long arm 8 of the lever 7 to the axle 14 of the wheel 13 of the vehicle. The letter B designates the center of the assembly for fastening one end of the reactive rod 10 to the axle 14, and the letter C designates the center of the angle for fastening the other end of the reactive rod 10 to the frame 12 (the sprung portion of the vehicle). The centers of the assemblies for load induced interaction between the spring 1 and the mating parts (the frame 12 and the short arm 9 of the lever 7) are designated in this and in other figures by the letter D (the center of the assembly for interaction with the frame 12), and by the letter E (the center of the assembly for interaction with the short arm 9 of the lever 7). The letter O designates the axis of rotation of the guiding lever 7 in its assembly for fastening to the frame 12 of the vehicle. Dot-and-dash lines designate the geometric axes of the lever 7, of the reactive rod 10, of the damper 11, and the neutral axis of the spring 1. The letter F designates the middle of the neutral axis of the spring 1. The letters $A_1, B_1, E_1, F_1$ designate the same centers as the letters A,B,E,F but when the wheel 13 drives over an obstacle having a height H.

The long arm 8 of the guiding lever 7 and the reactive rod 10 form a parallel link mechanism OABC in the plane of motion of the vehicle, thus ensuring a progressive displacement of the axle 14 of the wheel 13 when crossing an obstacle, and makes it possible to take up and to transmit tractive force as well as reactive and brake moments occuring on the wheel 13, to the frame 12.

Figure 10:
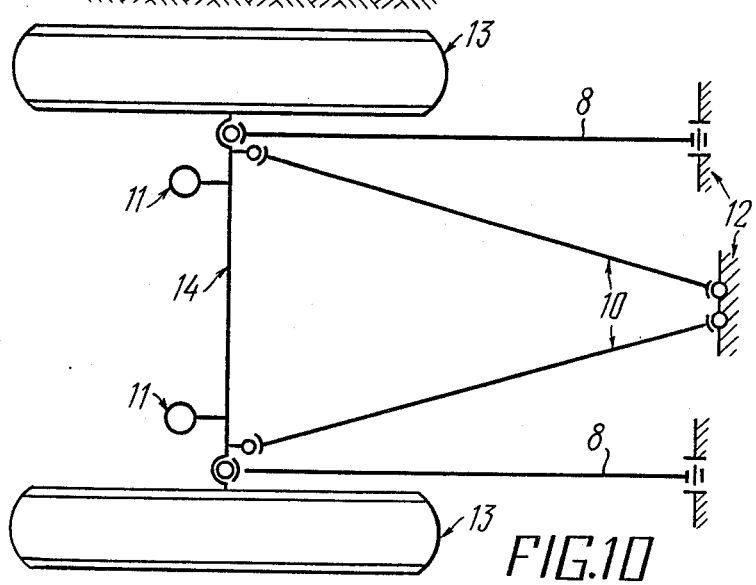
FIG. 10 is a mechanical diagram of the suspension shown in FIG. 9.

For better understanding of the suspension design, FIG. 10 shows the plan view of its mechanical diagram.

FIGS. 11 through 17 show some modifications of the vehicle suspension based upon the inventive spring and the guiding lever 7. The selection of one or another modification is determined by the operating conditions of a vehicle and by the design thereof.

FIG. 11 shows the suspension wherein the guiding lever 7 is constructed in such a manner that the angle $\beta$ between the geometrical axes of its long and short arms 8 and 9 is within 0° and 180°, and the spring 1 is installed in such a manner that the line DE connecting the centers D and E of the spring elements for pivotal connection is parallel to the line AO connecting the wheel axles of the vehicle, the leg portion 3,4 of the spring 1 being orientated in the direction of the road bed. Such a suspension is suitable for use in the case when there are no strict limitations as to the distance from the axle 14 of the wheel 13 to the lower surface of the sprung portion of the vehicle in the region of spring location. With limitations as to the distance from the axle 14 of the wheel 13 to the lower surface of the sprung portion of the vehicle, in the region of location of the spring 1, the leg portions 3,4 are to be orientated in the direction of the sprung portion (see FIG. 6).

FIG. 12 shows a suspension wherein the guiding lever 7 is constructed in such a manner that the angle $\beta$ between the geometric axes of its long and short arms 8,9 is greater than 180°, and the spring 1 is installed in such a manner that the angle between the line connecting the wheel axles of the vehicle, and the line DE connecting the centers D,E of the spring elements for pivotal connection is equal to 0°. This spring is suitable for use in the case when it is undesirable to change the distance between the axle 14 of the wheel 13 of the vehicle and the middle portion 2 of the spring 1.

FIG. 13 shows a suspension wherein the guiding lever 7 is constructed in such a manner that the angle $\beta$ between geometric axes of its long and short arms 8,9 is greater than 240°, and the spring 1 is installed in such a manner that the angle $\gamma$ between the line connecting the wheel axles of the vehicle and the line DE connecting the centers $D_1$ E of the spring elements for pivotal connection is greater than 90°. Such a suspension is suitable for use in the case when it is possible to remove the spring 1 from the region of location of the wheel 13 and to dispose it in some other place, for example in the region of the luggage compartment of a motor car.

FIG. 14 shows a suspension wherein the guiding lever 7 is constructed in such a manner that the angle $\beta$ between the geometric axes of its long and short arms 8,9 is equal to 0°, and the spring 1 is installed in such a manner that the angle $\gamma$ between the line connecting the wheel axles of the vehicle, and the line DE connecting the centers $D_1E$ of the spring elements for pivotal connection is not greater than 90°.

FIG. 15 shows a vehicle suspension wherein the guiding lever 7 is constructed in such a manner that the angle $\beta$ is greater than 270°, and the angle $\gamma$ is greater than 0°.

FIG. 16 shows a suspension wherein the angle $\beta$ is equal to 180°, and the angle $\gamma$ is equal to 90°.

FIG. 17 shows a suspension wherein the angle $\beta$ is smaller than 90°, and the angle $\gamma$ is not smaller than 90°.

It is to be noted that the spring 1 may be disposed in suspensions in a mirror-like position as against those shown in FIGS. 11 through 17.

Figure 18:
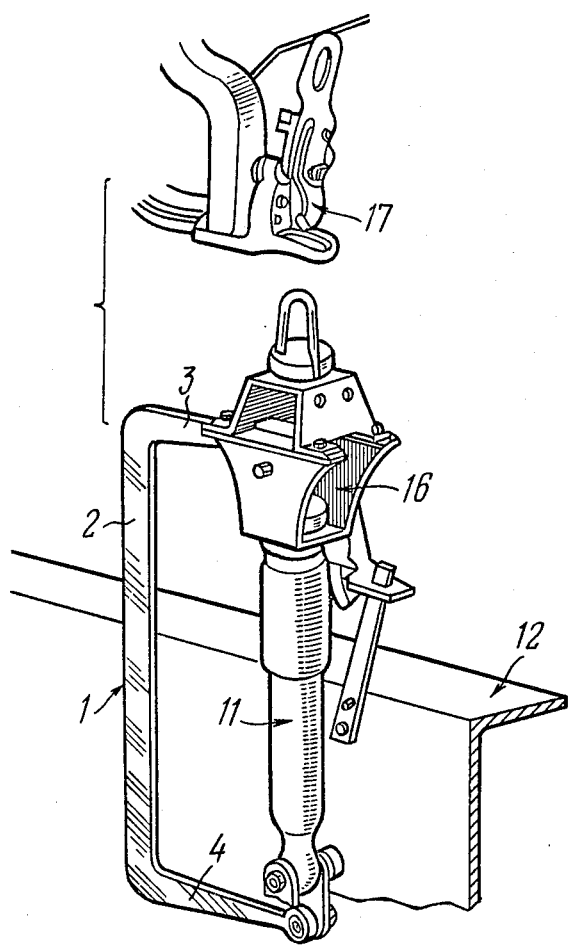
FIG. 18 is a vehicle suspension with a damper provided between the leg portions of the inventive spring.

FIG. 18 shows a vehicle suspension wherein a damper 11 is installed between the leg portions 3,4 of the spring 1. Such suspensions are suitable for use under slight loads (up to 500 kgf) e.g. for a tilt (hinged) truck cabin. In this case the leg portion 4 of the spring 1 is connected to the frame 12 of the vehicle while the leg portion 3 is provided with a device 16 for connecting the cabin thereto. The figure further demonstrates the cabin portion provided with a device 17 for connecting the cabin to the suspension.

The inventive suspension operates as follows. When the spring is compressed by the active and reactive forces $P_1, P_1'$ (see FIG. 8, line b) directed parallel to the middle portion 2 towards each other, the leg portions 3,4 deviate from their initial position for a certain distance. In doing so, the middle portion 2 of the spring deflects in the way shown in FIG. 8 (line b).

When the spring 1 is expanded (see FIG. 8, line c), the leg portions 3,4 deviate to the opposite sides. The middle portion 2 of the spring also deflects to the opposite side.

Now consider operation of the vehicle suspension including the spring of the invention.

When the wheel 13 (see FIG. 9) drives over an obstacle having a height H, the axle 14 progressively moves upwards while the arms 8,9 of the lever 7, and the reactive rod 10 turns to a certain angle $\alpha$. In doing so, the points A,B,E,F shift to the positions $A_1,B_1,E_1,F_1$ respectively. The spring 1 deflects, and its neutral line DFE takes the position shown by the line $D_1F_1E_1$. The longitudinal strain $EE_1$ of the spring 1 depends on the height H of the obstacle, on the ratio between the lengths of the long and the short arms 8,9 of the guiding lever 7, and on the elastic compliance of these arms 8,9.

During rebound, the elastic forces of the spring 1 and of the guiding lever 7 bring the suspension back to the initial condition.

The side force affecting the wheel 13 is transmitted to the frame 12 of the vehicle via the axle 14, the long arms 8 of the guiding levers and the reactive rods 10 (FIG.

10) which form a girder in the plane of action of the side force.

The suspension shown in FIG. 18 operates as follows.

In the working position the motor vehicle cabin is supported by the spring 1 via devices 16,17. Static and dynamic loads are transmitted from the cabin to the spring 1 and the damper 11. Under the action of these loads, the spring 1 deflects in a way shown in FIG. 8 (line b). The spring vibrations are absorbed by the damper 11.

As it has been above described, the main advantages of the spring of the invention and of the suspension using such a spring are a small mass and a simple design. In Table 1 there are given for comparison some parameters characterizing the inventive spring and the prior art coil compression and tension springs equally loaded and having the same strains.

TABLE 1

| Spring type | Kind of load | Load, kgf, | Maximum equivalent stress kgf/cm$^2$ | Total strain mm | Spring mass, kg | Note |
|---|---|---|---|---|---|---|
| Inventive (U-shaped) spring | Compression | 2000 | 11920 | 11.0 | 0.9 | The same spring |
| | Expansion | 2000 | 11920 | 11.0 | 0.9 | |
| Coil compression spring | Compression | 2000 | 11920 | 11 | 2.07 | d = 20 mm D = 80 mm |
| Coil expansion spring | Expansion | 2000 | 11920 | 11 | 2.99 | Spring mounted on screw plugs |

In the Table, the letter d designates the diameter of wire, and the letter D designates the average diameter of the spring turn. The mass of fastening and guiding parts is not included in the mass of the shown spring types.

INDUSTRIAL APPLICABILITY

The spring of the invention and a vehicle suspension including such spring may be used in transport, building machines and in earth excavating machines. The invention is preferably utilized in automobiles.

What is claimed is:

1. A spring constructed as a resilient U-shaped piece comprising: a middle portion, leg portions connected to and disposed in the same plane as the middle portion, bearing means disposed on one of the leg portions, means for taking an external load disposed on the other leg portion so that a line passing through the centers of the bearing means and of the means for taking an external load is parallel to the middle portion, said middle portion and said leg portions each having a rectangular cross section with a long axis and a short axis, the long axis of each of said portions lying in a single plane.

2. A spring as claimed in claim 1, wherein the means for taking an external load and the bearing means are constructed as elements for pivotal connection and are disposed on the ends of the leg portions.

3. A spring as claimed in claim 1, wherein the middle portion is of varying rectangular cross-section.

4. A spring as claimed in claim 1, wherein the leg portions are of varying rectangular cross-section.

5. A spring as claimed in claim 1, wherein said spring has such dimensions and shape that in each cross-section of the middle portion thereof the ratio between the maximum moment of inertia relative to the long axis thereof and the moment of deflection remains constant while the cross-sections are orientated relative to the plane of deflection of the spring and in such a manner that in each cross-section the axis relative to which the moment of inertia is maximum is normal to the plane of deflection of said spring.

6. A spring as claimed in claim 1, wherein the leg portions are of rectilinear cross-section and are disposed at an angle of 90° to 110° relative to the middle portion.

7. A spring as claimed in claim 1, wherein the leg portions are curvilinear.

8. A spring as claimed in claim 7, wherein the leg portions are constructed with a constant radius of curvature.

9. A vehicle suspension comprising a spring and a double-arm guiding lever having a short arm operatively connected to said spring and the long arm having elements for pivotal connection with a vehicle axle and with the sprung portion thereof respectively, characterised in that the spring (1) is constructed in accordance with claim 1, one leg portion (3) thereof being pivotally connected to the short arm (9) of the guiding lever (7), and the other arm (4) being, also pivotally, connected to the sprung portion of a vehicle, the arms (8,9) of the guiding lever (7) being in the same plane.

10. A vehicle suspension as claimed in claim 9, characterised in that the guiding lever (7) is constructed in such a manner that the angle ($\beta$) between the geometric axes of the long and short arms (8,9) thereof, counted clockwise, lies within 0° and 180°, and the spring (1) being installed in such a manner that the line (DE) connecting the centres (D,E) of the spring elements for pivotal connection is parallel to the line connecting wheel axles of the vehicle.

11. A vehicle suspension as claimed in claim 9, characterised in that the guiding lever (7) is constructed in such a manner that the angle ($\beta$) between the geometric axes of the long and short arms, (8,9) thereof, counted clockwise, is greater than 180°, the spring (1) being installed in such a manner that the angle between the line connecting the wheel axles of the vehicle and the line (DE) connecting the centres (D,E) of the spring elements for pivotal connection, also counted clockwise, is equal to 0°.

12. A vehicle suspension as claimed in claim 9, characterised in that the guiding lever (7) is constructed in such a manner that the angle ($\beta$) between the geometric axes of the long and short arms (8,9) thereof, counted clockwise, is greater than 240°, the spring (1) being installed in such a manner that the angle ($\gamma$) between the line connecting the wheel axles of the vehicle and the line (DE) connecting the centres (D,E) of the spring elements for pivotal connection, also counted clockwise, is greater than 90°.

13. A vehicle suspension as claimed in claim 9, characterised in that the guiding lever (7) is constructed in such a manner that the angle between the geometric axes of the long and short arms (8,9) thereof, counted clockwise, is equal to 0°, the spring (1) being installed in such a manner that the angle ($\gamma$) between the line connecting the wheel axles of the vehicle and the line (DE) connecting the centres (D,E) of the spring elements for pivotal connection, also counted clockwise, is not greater than 90°.

14. A vehicle suspension as claimed in claim 9, characterised in that the guiding lever (7) is constructed in such a manner that the angle ($\beta$) between the geometric axes of the long and short (8,9) thereof, counted clockwise, is greater than 270°, the spring (1) being installed in such a manner that the angle ($\gamma$) between the line connecting the wheel axles of the vehicle and the line (DE) connecting the centres (D,E) of the spring elements for pivotal connection also counted clockwise, is greater than 0°.

15. A vehicle suspension as claimed in claim 9, characterised in that the guiding lever (7) is constructed in such a manner that the angle ($\beta$) between the geometric axes of the long and short arms (8,9) thereof, counted clockwise, is equal to 180°, the spring (1) being installed in such a manner that the angle ($\gamma$) between the line connecting the wheel axles of the vehicle and the line (DE) connecting the centres (D,E) of the spring elements for pivotal connection, also counted clockwise, is equal to 90°.

16. A vehicle suspension as claimed in claim 9, characterised in that the guiding lever is (7) constructed in such a manner that the angle ($\beta$) between the geometric axes of the long and short arms (8,9) thereof, counted clockwise, is smaller than 90°, the spring (1) being installed in such a manner that the angle ($\gamma$) between the line connecting the wheel axles of the vehicle and the line (DE) connecting the centres (D,E) of the spring elements for pivotal connection also counted clockwise, is not smaller than 90°.

17. A vehicle suspension comprising a spring in combination with a damper, characterised in that the damper is mounted between the leg portions (3,4) of the spring (1) constructed in accordance with claim 1.

* * * * *